Nov. 5, 1968  E. G. CROSS  3,409,259
GYM SET HEADBAR ATTACHMENT CHANNEL
Filed June 19, 1967  2 Sheets-Sheet 1

INVENTOR:
EARL G. CROSS
BY Gravely, Lieder & Woodruff
ATTORNEYS.

Nov. 5, 1968  E. G. CROSS  3,409,259
GYM SET HEADBAR ATTACHMENT CHANNEL
Filed June 19, 1967  2 Sheets-Sheet 2

INVENTOR:
EARL G. CROSS
BY Gravely, Lieder & Woodruff
ATTORNEYS.

United States Patent Office 3,409,259
Patented Nov. 5, 1968

3,409,259
GYM SET HEADBAR ATTACHMENT CHANNEL
Earl G. Cross, Du Quoin, Ill., assignor to Turco Manufacturing Company, Du Quoin, Ill., a corporation of Missouri
Filed June 19, 1967, Ser. No. 646,982
9 Claims. (Cl. 248—214)

ABSTRACT OF THE DISCLOSURE

A bracket for suspending glide rides and the like from gym set headbars of different diameters. The bracket is a channel having inverted U-shaped openings in the flanges with a curved member fitted between the openings to engage the top surface of the largest diameter headbar. An attachment strap fastened through the web of the channel includes teeth which engage the bottom of the headbar. The bracket also includes a spacer fitted inside the curved member to reduce the effective diameter of the channel opening so that the bracket can be attached to a smaller diameter headbar.

BACKGROUND OF THE INVENTION

The basic design and assembly of gym sets for home yard use features a conventional A frame arrangement for support and stability. This supporting structure consists generally of four tubular legs mounted vertically by socket type fittings to each end of the horizontal tube. This horizontal tube, commonly referred to as a headbar, supports the various swings, glide rides, lawn swings and other play features. The glide ride or other features consist of smaller tubes secured to said headbar by metal fabricated channels. The channels are either welded in original fabrication to the headbar or secured by a clamp and bolt assembly through prepunched holes in the headbar.

The headbar channel and the vertical supports are subjected to the major wear and tear of the equipment. Heretofore on sets with welded head channels it was necessary to replace the entire headbar when only the channel was in need of replacement. Accordingly, it is a principal object of the present invention to provide a universal channel attachment for gym sets regardless of make, size or design.

Two basic diameter headbar tubes have been and are now being used in the entire gym set industry, namely 2" and 2½" diameter headbars. The present device is designed so that it will securely fit either of the foregoing headbars and may be secured in any position on a headbar without welding or drilling the headbar.

SUMMARY OF THE INVENTION

Briefly, the present invention comprises a bracket for suspending a swing set member of the glider type from an overhead longitudinal member of substantially circular cross section, including a bracket having opposed flanges with curved cutouts in the flanges, an insert fitted to the curved portions and engaging the upper surface of the bar and a retainer strap which passes beneath the headbar and is engaged therewith by inwardly directed teeth and is tightly fastened to the channel through the web portion thereof. The present invention further comprises a spacer member which can be positioned between the insert and the headbar so as to lessen the effective inside diameter of the cutouts in the bracket and therefore the same bracket can be attached to headbars of smaller size.

Further objects and advantages of the present invention will become apparent hereinafter.

In the drawings, wherein like numbers refer to like parts wherever they occur:

Figure 5:
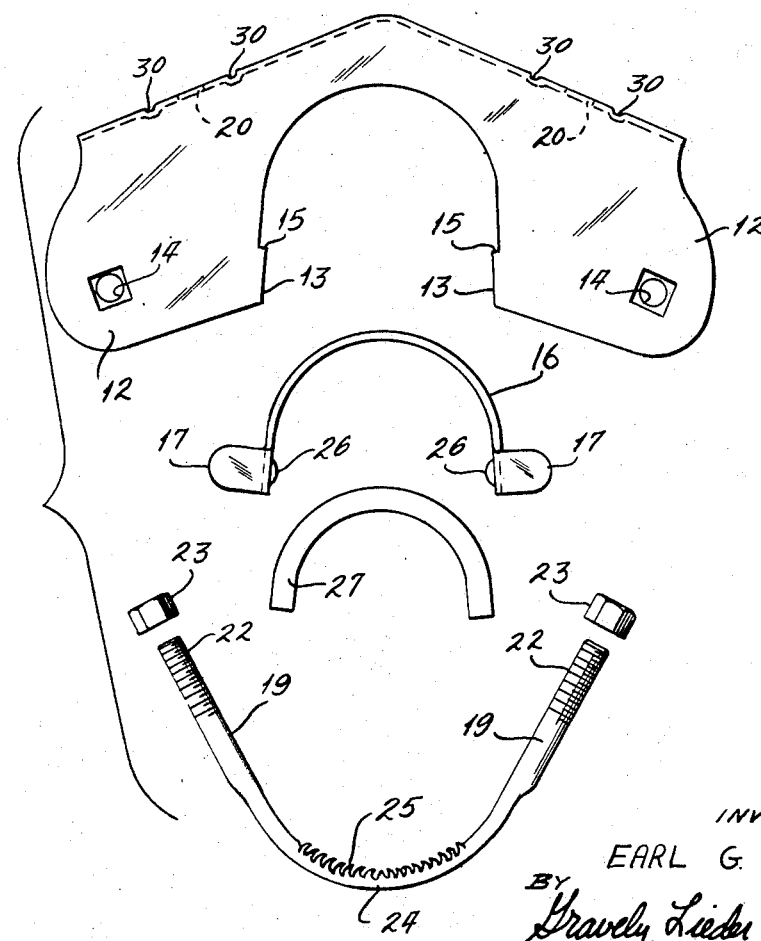
FIG. 5 is an exploded elevational view showing the arrangement of the parts of the present invention.

The basic bracket 10 comprises a web member 11 connecting opposed downwardly depending flanges 12. Each of the flanges 12 is provided with an arcuate open ended cutout 13 and is provided with bolt holes 14 for suspending a suitable play device therefrom. The bracket 10 is provided with opposed shoulders 15 (FIG. 5) in the cutout 13 adjacent to the open end thereof. Positioned in the cutout 13 is an insert 16, which fits against the inner surface of the arcuate portion of the cutout 13 and the ends of which rest against the shoulders 15 to retain the insert 16 to the bracket 10. Depending fingers 17 adjacent to the ends of the insert 16 are bent against the outer surface of the bracket flanges 12 to prevent longitudinal movement of the insert 16 with respect to the bracket 10. A curved notch 18 is formed in the insert 16 adjacent to the ends thereof to accommodate a strap 19 which passes through openings 20 in the web 11 and beneath the undersurface of the headbar 21 so as to retain the bracket 10 on the headbar 21.

Figure 3:
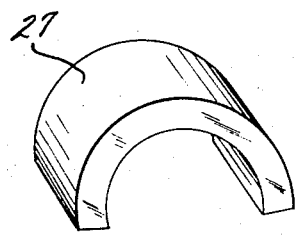
FIG. 3 is a perspective view of the spacer.

As shown, the strap 19 is threaded at 22 on its ends and a nut 23 is screwed down on each threaded end 22 to pull the strap 19 toward the headbar 21. The strap 19 is flattened at 24 in its headbar engaging area and is provided with inwardly directed teeth 25 which engage the headbar 21 and prevent rotative movement of the bracket 10 with respect to the headbar 21. As may be seen in FIGS. 1, 3 and 5, the teeth 25 on the left side of the area 24 are curved toward the center and the teeth 25 on the right side of the area 24 are oppositely curved, also toward the center. Thus the teeth 25 prevent rotation of the strap 19 with respect to the headbars 21 and 21a. The teeth 25 also prevent longitudinal movement of the bracket 10 with respect to the headbar 21. The insert 16 is provided with outwardly formed dimples 26 adjacent to the ends thereof. The dimples 26 engage the headbar 21 and further restrict rotative movement of the bracket 10 with respect to the headbar 21.

Figure 1:
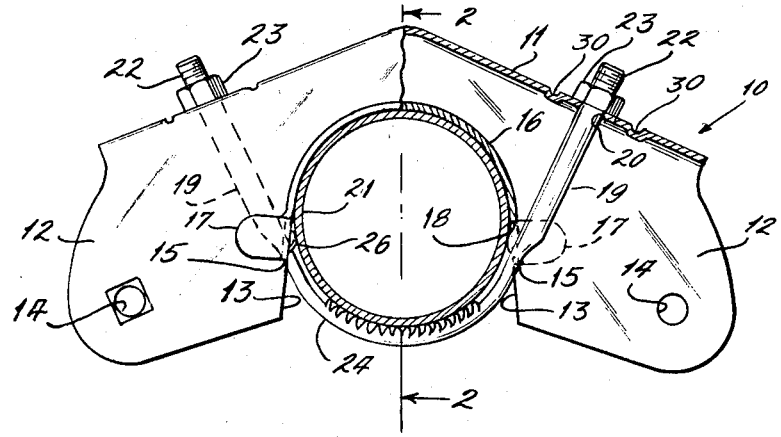
FIG. 1 is an elevational view, partly in section, of the present invention.
Figure 2:
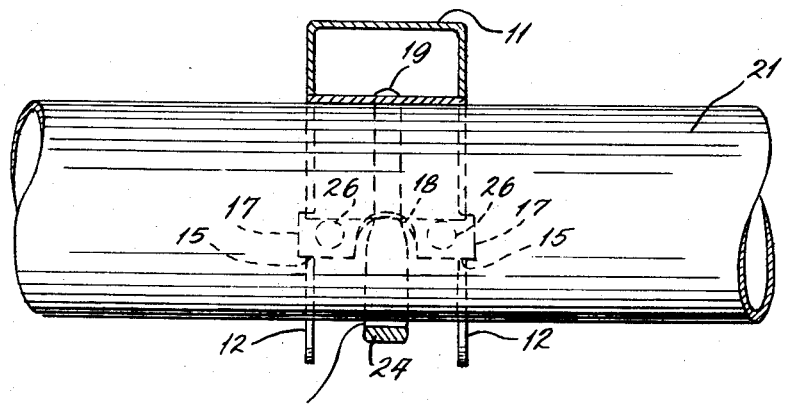
FIG. 2 is a sectional view taken along line 2—2 of FIG. 1.

The foregoing described form of the invention is shown specifically in FIG. 1. As designed, the diameter of the curved portion of the inert 16 is 2½" to accommodate the conventional 2½" diameter headbar 21. Obviously this could be changed depending upon the actual diameter of the headbar to which it is designed to attach the bracket.

Figure 4:
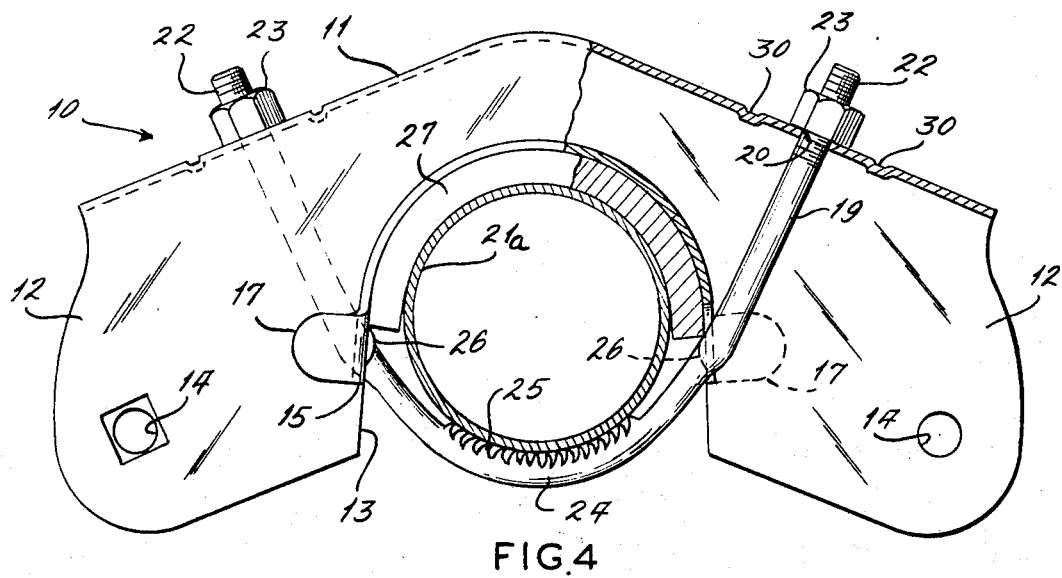
FIG. 4 is an elevational view showing the present invention applied to a headbar using the spacer.

The form of the invention shown more specifically in FIG. 4 includes a curved spacer 27 positioned between the upper surface of the smaller diameter headbar 21a and the inner surface of the insert 16.

The spacer 27 slides into the channel 16 above the dimple 26, and is retained therein and restrained against rotation by the dimples 26.

The function of the spacer 27 is to effectively lessen the diameter of the opening in the side flanges 12 so that the bracket 10 can be fastened to a tube or headbar 21a having a smaller diameter than that of a headbar accommodated by the insert 16 alone. Such smaller headbars conventionally have 2" diameters.

The spacer 27 has an opening of slightly less diameter than the outside diameter of the tube 21a. Thus the spacer 27 snaps over the tube 21a and passes the horizontal centerline so as to grip the tube 21a and frictionally engage the same.

Thus it is seen that the present bracket has universal application to substantially circular cross-sectional headbars.

Accordingly, it is submitted that the present invention achieves all of the objects and advantages sought therefor. The present invention is designed to cover all modifications and changes of the examples of the invention herein chosen for purposes of disclosure which do not constitute departures from the spirit and scope of the invention.

What is claimed is:

1. A bracket for suspending a swing set member of the glider type from an overhead longitudinal member having a substantially circular cross section comprising
   (a) longitudinally spaced opposed flanges each provided with open ended longitudinally aligned cutouts having arcuate portions,
   (b) a web connecting the flanges at the top edges remote from the open ends of the cutouts and provided with spaced openings on each side of the cutouts,
   (c) a retainer strap having a section engaged with the underside of the horizontal member and having ends which project through the openings in the web, and
   (d) means for fastening the ends of the strap to the web to tightly engage the strap to the longitudinal member to non-rotatively fasten the bracket to the longitudinal member.

2. The structure of claim 1 wherein the flanges are provided with notches in the cutout portions adjacent to the open ends of the cutout portions to define opposed curved edges terminating in longitudinally opposed shoulders and including an insert member having a curved body adapted to fit against the shoulders in the flanges.

3. The structure of claim 2 including depending fingers on the insert member bent against the outer surfaces of the flanges to prevent longitudinal displacement of the insert and longitudinal strengthening ribs on the web on each side of the openings therein.

4. The structure of claim 2 wherein the insert is provided with projections for engaging the overhead longitudinal member.

5. The structure of claim 2 including opposed cutouts in the insert through which the retainer strap passes.

6. The structure of claim 2 including a curved spacer member adapted to fit against the inner surface of the insert to lessen the effective diameter of the cutouts in the flanges and thereby accommodate an overhead horizontal member of smaller diameter, said spacer being retained between the projections on the insert.

7. The structure of claim 1 wherein the retainer strap is provided with inwardly projecting opposed teeth to engage the undersurface of the overhead horizontal member.

8. A bracket adaptable for suspending a swing set member of the glider type from overhead longitudinal members of different diameters and of substantially circular cross sections comprising
   (a) longitudinally spaced opposed flanges each provided with open ended longitudinally aligned cutouts having arcuate portions terminating in longitudinally opposed shoulders,
   (b) a web connecting the flanges at the top edges remote from the open ends of the cutouts and provided with spaced openings on each side of the cutouts,
   (c) a curved insert defining the largest diameter overhead member to which the bracket may be applied, said insert positioned against the arcuate portions of the flange cutouts and engaging the shoulders, means preventing longitudinal displacement of the insert when in the flanges, projections on the inner surface of the insert engaging the longitudinal overhead member when the bracket is applied to the largest diameter overhead member,
   (d) a retainer strap having a section engaged with the underside of the horizontal member and having ends which project through the openings in the web,
   (e) means for fastening the ends of the straps to the web to tightly engage the strap to the longitudinal member to non-rotatively fasten the bracket to the longitudinal member,
   (f) and a curved spacer member positionable adjacent to the inner surface of the insert to lessen the effective diameter of the insert, said spacer member receiving an overhead longitudinal member of lesser diameter so that the bracket is attachable to said lesser diameter overhead member, said spacer being retained between the insert projections.

9. The structure of claim 8 wherein the section of the strap engaging the overhead horizontal member is flattened and the strap is provided with inwardly projecting teeth means for engaging the undersurface of the horizontal member to prevent rotative and longitudinal movement of the bracket and the horizontal member.

References Cited

UNITED STATES PATENTS

| | | | |
|---|---|---|---|
| 1,296,060 | 3/1919 | Ferguson | 248—230 |
| 1,898,640 | 2/1933 | Moss | 248—221 |
| 3,145,013 | 8/1964 | Grudoski | 248—230 XR |
| 3,199,815 | 8/1965 | Martinkovic et al. | 248—226 XR |

JOHN PETO, *Primary Examiner.*